United States Patent
Li et al.

(10) Patent No.: US 7,979,859 B2
(45) Date of Patent: Jul. 12, 2011

(54) MANAGING AUTOMATED RESOURCE PROVISIONING WITH A WORKLOAD SCHEDULER

(75) Inventors: Geyu Li, Scarborough (CA); Michael George Polan, Markham (CA); Wai Kit Jerry Tsui, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1835 days.

(21) Appl. No.: 11/120,924

(22) Filed: May 3, 2005

(65) Prior Publication Data
US 2006/0250981 A1 Nov. 9, 2006

(51) Int. Cl.
*G06F 11/00* (2006.01)
*G06F 9/46* (2006.01)
*G06F 15/173* (2006.01)

(52) U.S. Cl. ............ 718/102; 718/106; 718/104; 714/1; 714/2; 714/47; 709/224; 709/225; 709/226; 709/229

(58) Field of Classification Search .................. None
See application file for complete search history.

(56) References Cited

U.S. PATENT DOCUMENTS

| | | | | |
|---|---|---|---|---|
| 5,918,226 A * | 6/1999 | Tarumi et al. | ................... | 707/10 |
| 5,963,911 A | 10/1999 | Walker et al. | ..................... | 705/7 |
| 6,249,769 B1 * | 6/2001 | Ruffin et al. | ....................... | 705/7 |
| 6,578,005 B1 | 6/2003 | Lesaint et al. | .................... | 705/8 |
| 6,898,702 B1 * | 5/2005 | Evans | ............................... | 713/2 |
| 6,993,763 B2 * | 1/2006 | Hayes, Jr. | ..................... | 718/102 |
| 7,281,045 B2 * | 10/2007 | Aggarwal et al. | ............. | 709/226 |
| 7,461,149 B2 * | 12/2008 | Gasca et al. | ................... | 709/226 |
| 7,483,374 B2 * | 1/2009 | Nilakantan et al. | ............ | 370/235 |
| 7,698,430 B2 * | 4/2010 | Jackson | ........................... | 709/226 |
| 2002/0147801 A1 * | 10/2002 | Gullotta et al. | .................. | 709/223 |
| 2002/0152305 A1 * | 10/2002 | Jackson et al. | ................. | 709/224 |
| 2003/0037090 A1 * | 2/2003 | Koh | ................................ | 709/100 |
| 2003/0069974 A1 * | 4/2003 | Lu et al. | ......................... | 709/226 |
| 2003/0105654 A1 * | 6/2003 | MacLeod et al. | .................. | 705/7 |
| 2003/0154232 A1 * | 8/2003 | Beringer et al. | ............... | 709/102 |
| 2004/0015976 A1 * | 1/2004 | Lam | ................................ | 718/104 |
| 2004/0181794 A1 * | 9/2004 | Coleman et al. | .............. | 718/104 |
| 2005/0028158 A1 * | 2/2005 | Ferguson et al. | .............. | 718/100 |
| 2005/0097560 A1 * | 5/2005 | Rolia et al. | ..................... | 718/104 |
| 2006/0025985 A1 * | 2/2006 | Vinberg et al. | ................... | 703/22 |
| 2006/0150159 A1 * | 7/2006 | Fellenstein et al. | ........... | 717/126 |
| 2006/0161753 A1 * | 7/2006 | Aschoff et al. | ................ | 711/170 |
| 2007/0220521 A1 * | 9/2007 | Chevanne et al. | ............. | 718/104 |

(Continued)

OTHER PUBLICATIONS

Bhuvan Urgaonkar, Prashant Shenoy, Timothy Roscoe, "Resource Overbooking and Application Profilinf in Shared Hosting Platforms" Jan. 16, 2005, ACM, pp. 1-15.*

(Continued)

*Primary Examiner* — Jennifer N To
*Assistant Examiner* — Abdullah Al Kawsar
(74) *Attorney, Agent, or Firm* — Yee & Associates, P.C.; Jeffrey S. LaBaw

(57) ABSTRACT

The present invention provides a method, system, and computer program product for managing automated resource provisioning management systems. In an embodiment, the method begins by receiving a plurality of provisioning operations from a resource provisioning management system. Each of these provisioning operations is linked to a specific job. A determination is then made as to which jobs are to be managed. The jobs are then grouped together and job dependencies are identified. The jobs are then scheduled for execution. At the appropriate time, the jobs are invoked. The jobs are audited as they are being performed.

15 Claims, 4 Drawing Sheets

U.S. PATENT DOCUMENTS

2011/0016219 A1* 1/2011 Merkow et al. ............... 709/229

OTHER PUBLICATIONS

Integrating IBM Tivoli Workload Scheduler and Content Manager OnDemand to Provide Centralized Job Log Processing; IBM RedBooks; Oct. 2003.*

Provisioning On Demand Introducing IBM Tivoli Intelligent ThinkDynamic Orchestrator; IBM RedBooks; Dec. 2003.*

Yuan, "Energy-Efficient Soft Real-Time CPU Scheduling for Mobile Multimedia Systems", ACM Digital Library, 2003, pp. 149-163.

Chase et al., "Managing Energy and Server Resources in Hosting Centers", ACM Digital Library, 2001, pp. 103-116.

Naik et al., "Adaptive Resource Sharing in a Web Services Environment", ACM Digital Library, 2004, pp. 311-330.

Urgaonkar et al., "Resource Overbooking and Application Profiling in Shared Hosting Platforms", ACM Digital Library, USENIX Association, $5^{th}$ Symposium on Operating Systems Design and Implementation, pp. 239-254, Jan. 2005.

Karlsson et al, "Triage: performance isolation and differentiation for storage systems", IEEE, 2004, pp. 67-74.

Dan et al., "Web services on demand: WSLA-driven automated management", IBM Systems vol. 43, No. 1, 2004, pp. 136-158.

Alvarez et al., "MINERVAL: an automated resource provisioning tool for large-scale storage systems", ACM Transactions on Computer Systems, vol. 19, No. 4, 2001, pp. 483-518.

* cited by examiner

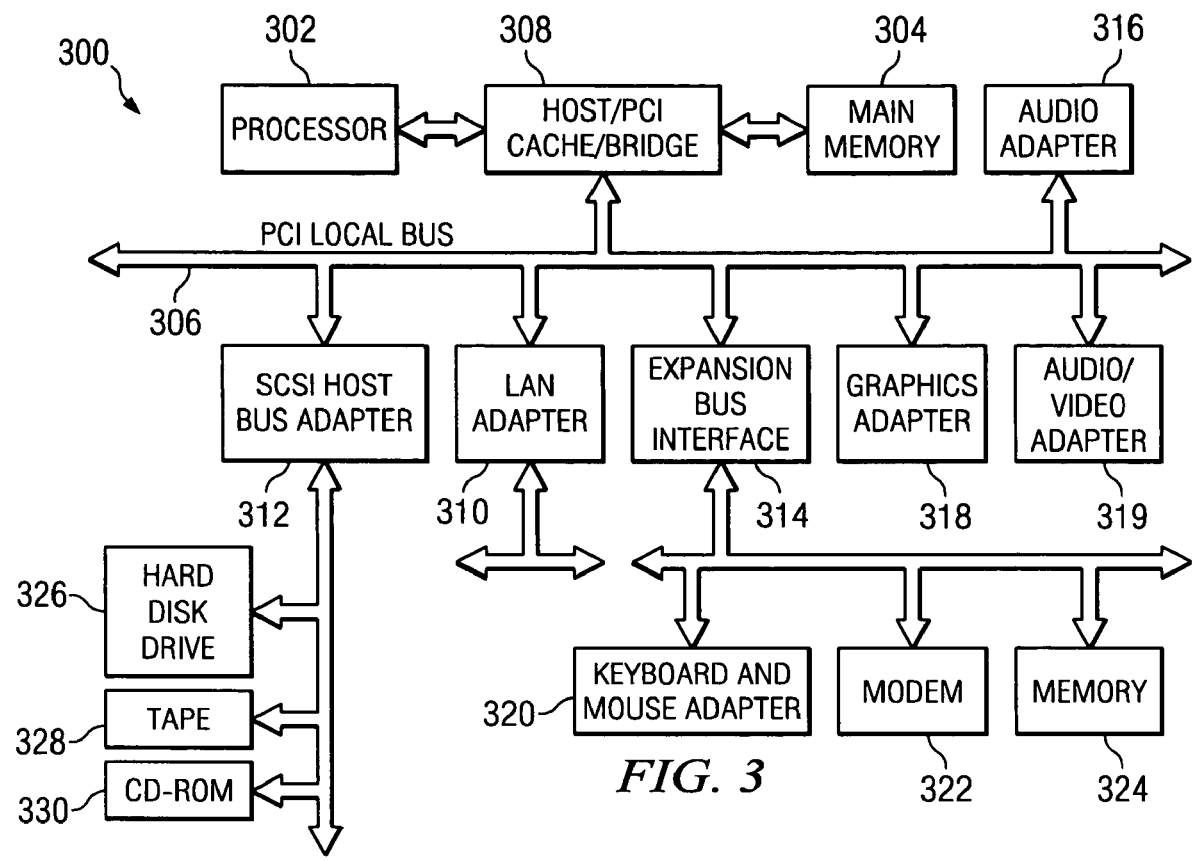
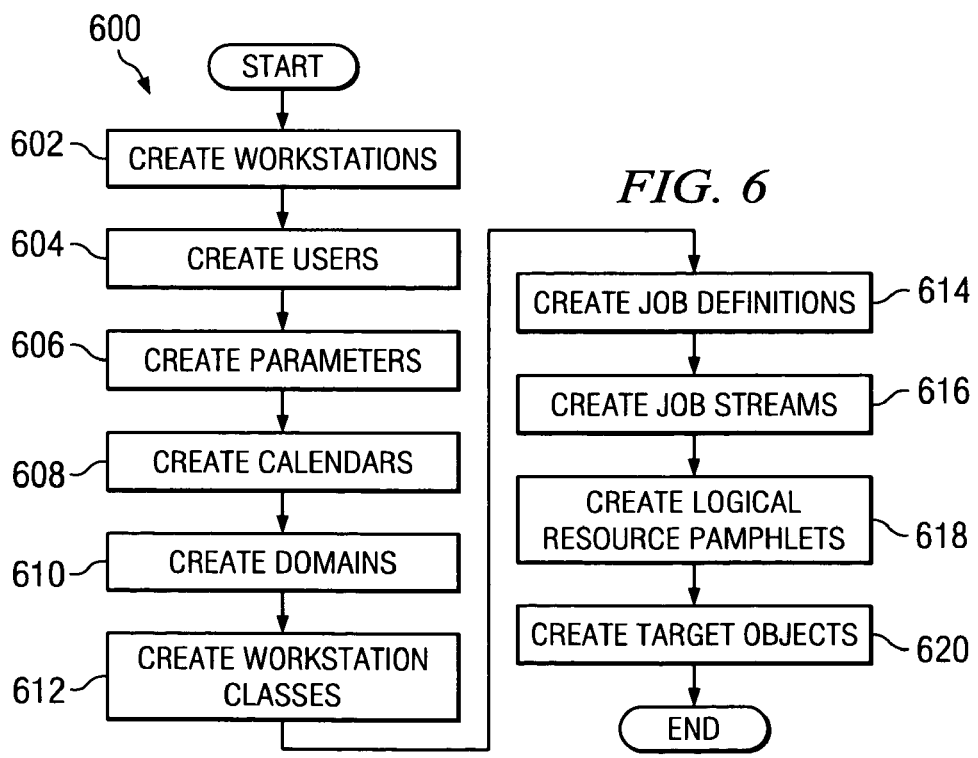
FIG. 3
FIG. 6

MANAGING AUTOMATED RESOURCE PROVISIONING WITH A WORKLOAD SCHEDULER

BACKGROUND OF THE INVENTION

1. Technical Field

The present invention relates, generally, to resource provisioning management (RPM) systems. More specifically, the present invention relates to a method, system and computer program product for managing automated RPM systems.

2. Description of Related Art

In the business environment today, businesses must collect and efficiently use large amounts of data. This has led to the development of data centers. Data centers have evolved greatly over the last few years. They have been growing in size and gaining importance in the business environment. With this growth, information technology (IT) organizations are managing a complex mix of vendors, hardware, software, operating systems, configurations, and patches. As a result, keeping pace with configuration changes while minimizing system downtime and maximizing staff productivity is increasingly difficult. The burden on an IT organization and its personnel to manually administer these resources is typically dependent on the size of the organization (the number of users) and the rate at which users join or leave the organization or otherwise change roles. To improve efficiency and reduce the burden on the IT organization and its personnel, some organizations have used software applications which automate or partially automate some of the tasks.

The software applications which automate or partially automate some of the tasks relating to provisioning certain, limited types of resources to users are operable on a communication network for provisioning users with resources according to established criteria. Systems employing such software applications will be generally referred to herein as RPM systems.

However, the problem of provisioning is only partly solved by employing an automated resource provisioning tool which helps IT administrators by relieving them from manually making the required changes and updates needed to maintain the data centers. With the unprecedented growth in datacenter operations, the number of different target end points managed by a datacenter is increasing. The number of different automated provisioning operations resulting from different hardware and software configurations is also increasing. This increase has created an additional need for IT administrators to efficiently manage these end points and provisioning operations in order to effectively improve the services they provide and lower the costs within an increasingly complex computing environment. Therefore, it would be advantageous to provide a method, system, and computer program product for managing automated RPM systems.

SUMMARY OF THE INVENTION

Embodiments of the present invention provide a method, system, and computer program product for managing automated resource provisioning management systems. In an embodiment of the present invention, the method begins by receiving a plurality of provisioning operations from a resource provisioning management system. Each of these provisioning operations is linked to a specific job. A determination is then made as to which jobs are to be managed. The jobs are then grouped together and job dependencies are identified. The jobs are then scheduled for execution. At the appropriate time, the jobs are invoked. The jobs are audited as they are being performed.

BRIEF DESCRIPTION OF THE DRAWINGS

The novel features believed characteristic of embodiments of the invention are set forth in the appended claims. Embodiments of the invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating a data processing system in which the present invention may be implemented.

FIG. 6 is a flowchart of a workload scheduler task flow, in accordance with an embodiment of the present invention.

DETAILED DESCRIPTION OF THE PREFERRED EMBODIMENT

Figure 1:
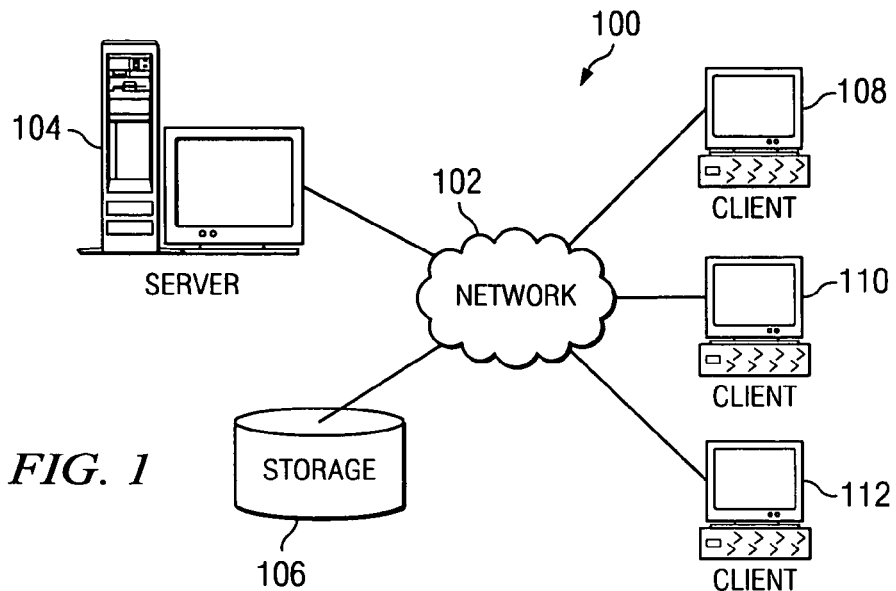
FIG. 1 is a pictorial representation of a network of data processing systems in which embodiments of the present invention may be implemented.

With reference now to the figures, FIG. 1 depicts a pictorial representation of a network of data processing systems in which embodiments of the present invention may be implemented. Network data processing system 100 is a network of computers in which embodiments of the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for embodiments of the present invention.

Figure 2:
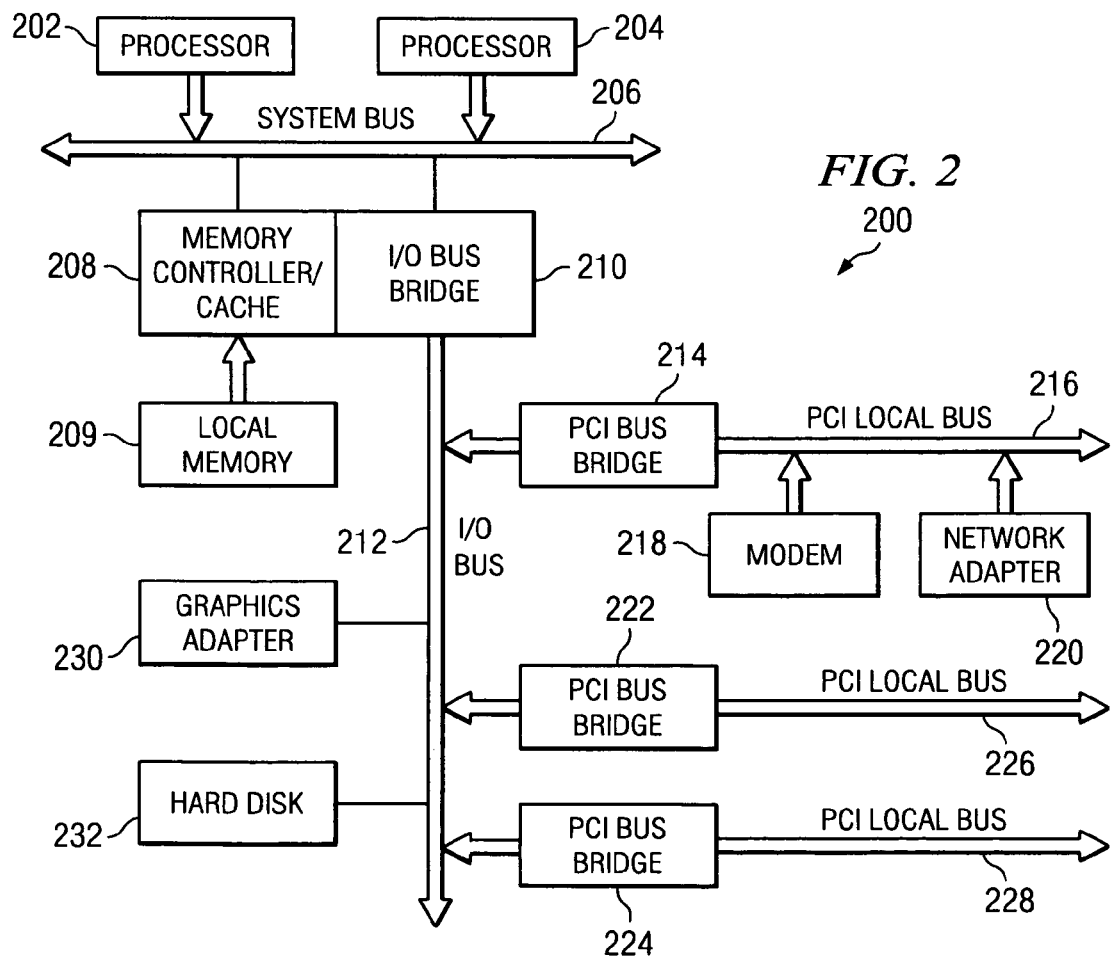
FIG. 2 is a block diagram of a data processing system that may be implemented as a server in accordance with an embodiment of the present invention.

Referring to FIG. 2, a block diagram of a data processing system that may be implemented as a server, such as server 104 in FIG. 1, is depicted in accordance with an embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to embodiments of the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which embodiments of the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of embodiments of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The mechanism of embodiments of the present invention leverages the technologies used by commercial workload scheduling products to handle the large number of tasks and targets that must be managed in the process of automating a data center. Provisioning management includes assigning work to execute on distributed systems, using a scheduler to dispatch work at the appropriate time, identify and manage dependencies, prerequisites and co-requisites between workloads, and limitations on endpoints, including resource constraints. When complete, the distributed processes that make up the workflow steps are correlated back to the task or top level for which they were executed in order to allow inspection by the task owner.

When operating data centers, a large number of operations are initiated and managed vis-à-vis a large variety of distributed targets. Traditional workload managers address a similar set of problems by managing multiple, distributed computing operations to perform business tasks on constrained resources or within time constraints. Data center automation can be achieved by applying these known techniques of distributed workload management to managing data center tasks that have been automated. These techniques dramatically simplify a problem of data center management, such as the task of applying multiple patches to large numbers of homogeneous server targets and correlating the results of the patch application. As security patch management becomes increasingly critical, it is vital that an operator be able to determine the progress, success or failure of each of the steps involved.

Many different provisioning activities are performed in a data center. These may include the following:
- installing and updating agents in targets
- installing, uninstalling, backing up and restoring software
- dispatching patches and applying updates
- installing, backing up and restoring operating system images for large number of targets
- allocating storage volumes
- discovering new targets
- deploying application and setting up test environments
- other provisioning activities Although these provisioning activities are automated, in a typical data center where a large number of targets are managed, managing and monitoring all these activities is difficult, especially when provisioning order dependencies and workload are considerations.

Techniques to initiate and manage a large number of provisioning operations against a large variety of distributed targets managed by a data center can be employed. These techniques can significantly simplify the data center management problems described above and provide an effective way to manage provisioning operations dealing with large numbers of targets. A distributed workload scheduling system can automate, plan and control the processing of work. It can:
- allow workload planning
- schedule activities
- resolve workload dependencies
- launch and track jobs
- automate management of workload to minimize human errors in production workload processing
- facilitate workload monitoring
- support centralized systems management so that it can automate, monitor, and control the flow of work on both local and remote systems from a single point of control
- Report status, progress or results of the work
- otherwise process work Such a distributed workload system could be a commercial system integrated with a RPM. In another embodiment, common workload management algorithms and a distributed task scheduler may be directly integrated into the RPM.

A workload scheduler creates a workload plan which includes users, job streams, jobs, dependencies, time restrictions, target resources, calendar, workstations, management domains, and business process cycles based on data center provisioning operations. In order to manage the workload plan, the workload scheduler manages many tasks, most of which are day-to-day provisioning tasks upon which the data center depends. In order to manage these day-to-day tasks, the workload scheduler also creates a task flow, which works in conjunction with the workload plan.

For example, a workload scheduler has to schedule provisioning jobs across a network. Assume that one of the provisioning jobs requires dispatching and applying a security patch which has some prerequisite requirements, onto a large number of computers in a GRID (peer-to-peer) environment. This particular provisioning job has a dependency on another provisioning job that verifies the current patch level of the target machines. The workload scheduler may then be used to schedule these jobs across the network based on a specified date and time. Jobs can be grouped together according to function, application, or type of targets. Limits on the number of jobs that can be run concurrently can be set. The workload scheduler ensures correct processing order by identifying dependencies, such as successful completion of the patch level verification job, existence of the new patch files, and availability of any relevant resources required for this provisioning. Automatic recovery procedures can also be setup for unsuccessful provision operations. For instance, if deployment of the new patch fails on some of the GRID computers, steps that have been setup to un-provision will be invoked automatically by the workload scheduler.

In one embodiment, the workload scheduler provides a real time view of the status of work. Data center administrators can make use of this facility to query about the status and identify any problems in the provisioning operations.

Figure 4:
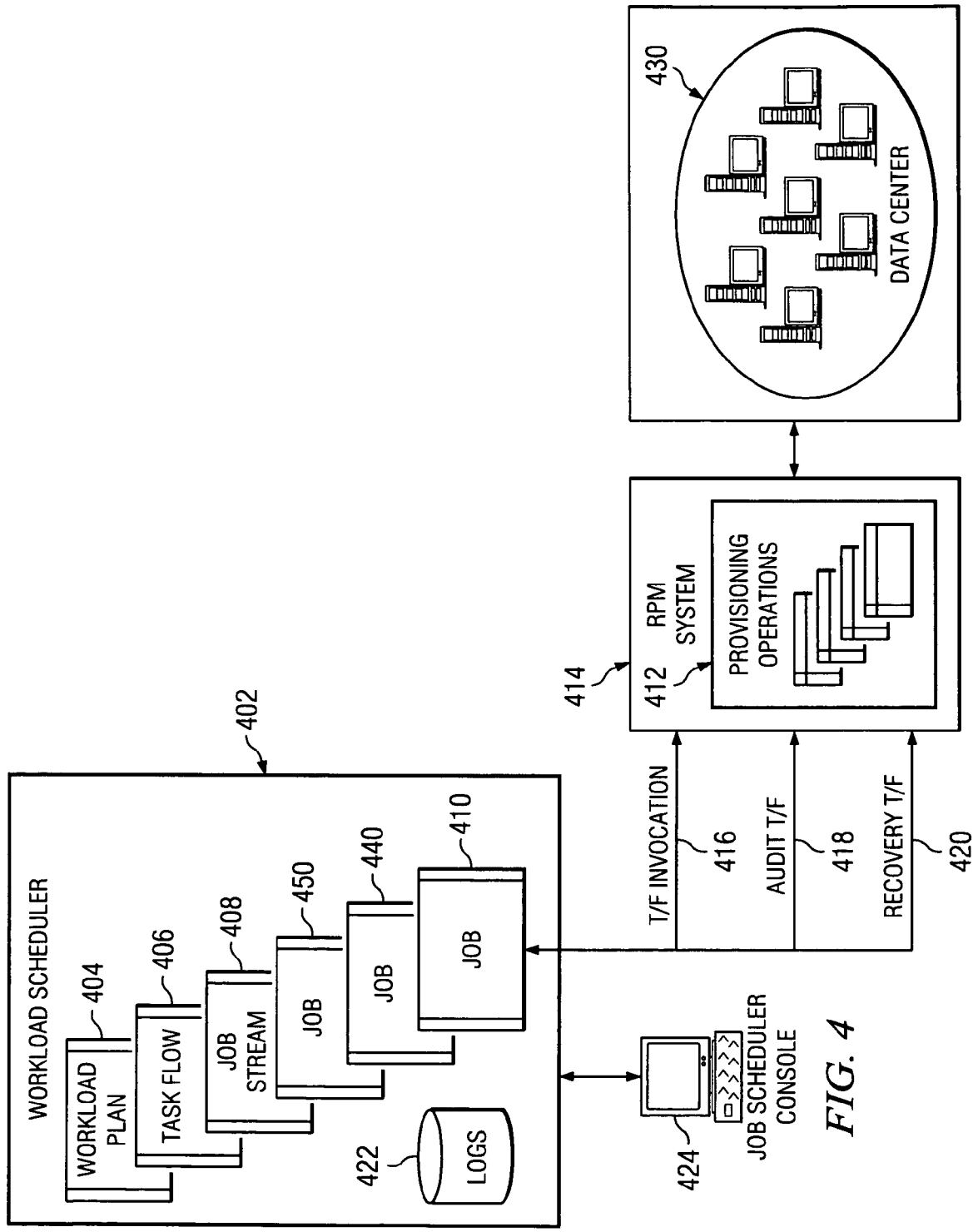
FIG. 4 is a pictorial representation of a system incorporating a workload scheduler to manage an automated RPM system, in accordance with an embodiment of the present invention.

FIG. 4 is a pictorial representation of a system incorporating a workload scheduler to manage an automated RPM system, in accordance with an embodiment of the present invention. In order to carryout a complex provisioning plan, workload scheduler 402 creates workload plan 404 for all the provisioning requirements of data center 430. A workload plan can include users, job streams, jobs, dependencies, time restrictions, target resources, calendar, workstations, management domains, business process cycles, and other work related tasks. Workload scheduler 402 also creates task flow 406 to carry out workload plan 404. FIG. 6 is an example of a task flow. Task flows are very useful in managing the day-to-day provisioning requirements of a data center. Task flow 406 yields job stream 408. Job stream 408 can contain multiple workload jobs, such as workload jobs 410, 440 and 450. A workload job definition includes command scripts, operator's security role, recovery options, recovery job, audit job, current conditions, resource information, execution history, and the job definition. Each workload job, such as workload job 410, is linked to a provisioning operation, such as provisioning operation 412 in RPM system 414. RPM system 414 is an automated resource provisioning system for data center 430.

In one embodiment, workload operators or administrators manage task flows by configuring a job stream, adding or removing one or more jobs, customizing a calendar, managing security roles, managing configuration parameters, managing dependencies and resources, and performing other management operations.

When the scheduled time comes, task flow 406 is invoked directly under control of a system monitor. A command invoking provisioning operation 412 is sent to RPM 414, as indicated in the present example by line 416, which causes provisioning operation 412 to be invoked and executed. If provisioning operation 412 fails, a recovery job is invoked from the task flow to perform recovery activities in the RPM system, as indicated in the present example by line 420. An audit job defined in workload scheduler 402 monitors and audits the results of provisioning operation 412, as indicated in the present example by line 418. The results are stored in logs 422. Job scheduler console 424 allows all events to be managed by an administrator.

Figure 5:
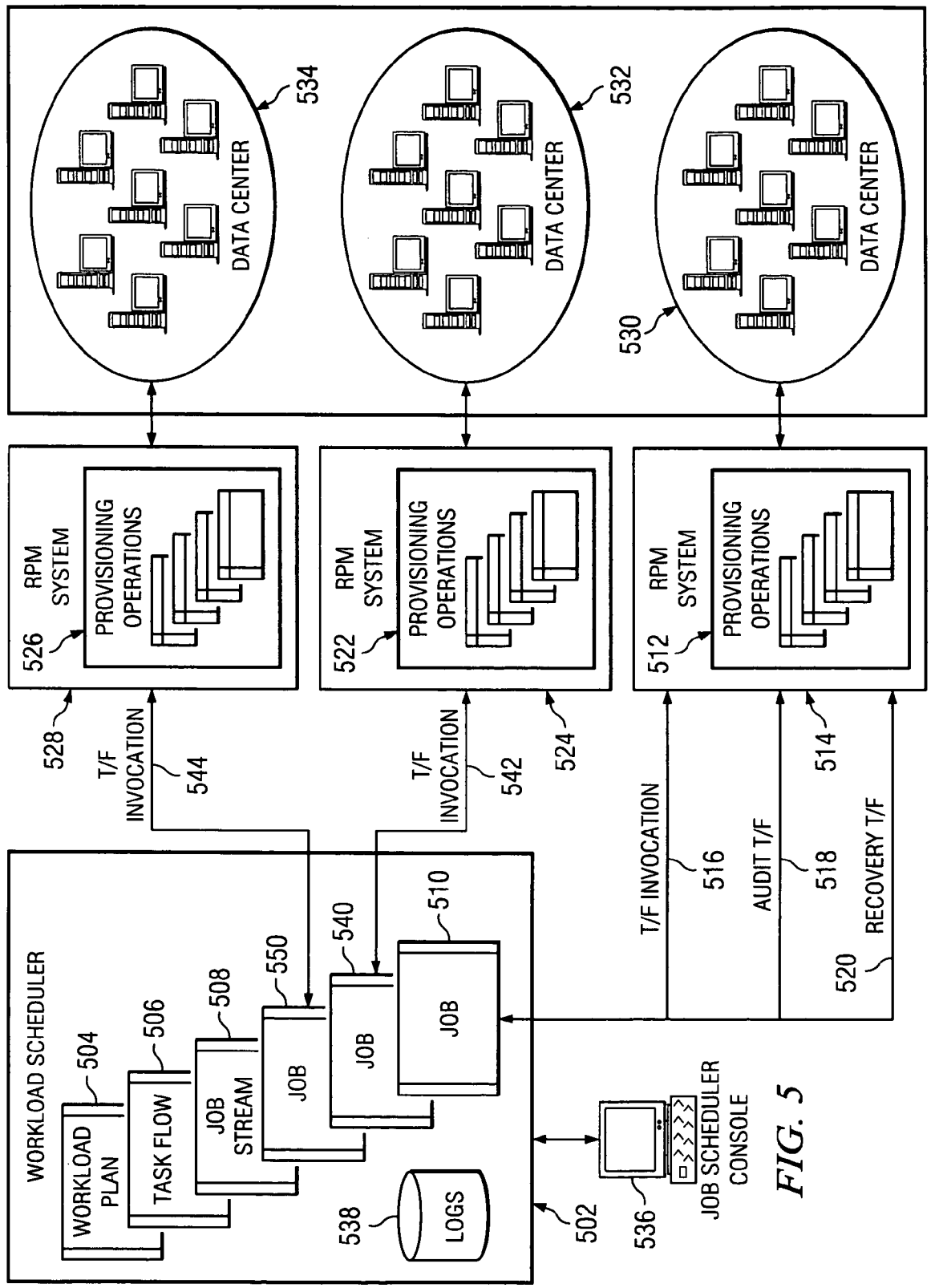
FIG. 5 is a pictorial representation of a system incorporating a workload scheduler to manage multiple automated RPM systems, in accordance with an embodiment of the present invention.

FIG. 5 is a pictorial representation of a system incorporating a workload scheduler, such as workload scheduler 402 in FIG. 4, to manage multiple automated RPM systems, such as RPM system 414 in FIG. 4, in accordance with an embodiment of the present invention. Workload scheduler 502 creates one workload plan 504 encompassing all the provisioning requirements of all data centers 530, 532 and 534. Workload scheduler 502 also creates task flow 506 to carry out workload plan 504. Task flow 506 yields job stream 508. Job stream 508 can contain multiple workload jobs, such as workload jobs 510, 540 and 550. Each workload job, such as workload job 510, is linked to a particular provisioning operation for a particular RPM system, such as provisioning operations 512, 522 and 526 for RPM systems 514, 524 and 528, respectively. RPM systems 514, 524 and 528 are automated resource provisioning systems for data centers 530, 532 and 534, respectively.

When the scheduled time comes, task flow 506 is invoked directly under control of a system monitor. A command invoking the provisioning operation, such as provisioning operation 512, is sent to the specific RPM system that the workload job is linked to, as indicated by lines 516, 542 and 544, connecting to RPM systems 514, 524 and 528, respectively, which causes provisioning operation 512, to be invoked and executed. If the provisioning operation fails, a recovery job is invoked from the task flow to perform recovery activities in the RPM system, as indicated in the present example by line 520. An audit job defined in workload scheduler 502 monitors and audits the results of the provisioning operation, as indicated in the present example by line 518. The results are stored in logs 538. Job scheduler console 536 allows all events to be managed by an administrator.

In an alternate embodiment, rather than having one task flow that handles all the tasks for all the RPM systems, the workload scheduler may generate separate task flows, one targeted for each RPM system.

Referring now to FIG. 6, FIG. 6 is a flowchart of a workload scheduler task flow, such as task flow 404 in FIG. 4, in accordance with an embodiment of the present invention. The exact steps taken in a task flow vary with the specific implementation and the specific workload scheduler used. The following example is a task flow for a Tivoli Workload Scheduler, a product of International Business Machines Corporation in Armonk, N.Y. The method is designated by reference number 600 and begins by creating workstations, such as a physical server (step 602). Next, any necessary users are created (step 604). Then parameters are created (step 606). Parameters can be any attributes that need to be paired with the user and vary by implementation. Then calendars are created for scheduling the jobs (step 608). Domains are created (step 610). The concept of domains is used to manage devices. A domain is a group of devices. Then workstation classes are created (step 612). Workstation classes control the actions of the workstations. Workstation classes are logical class objects controlled by the workload scheduler, which map to a physical object of the data center, a workstation. Job definitions are created (step 614). Job definitions are any workflow operation that needs to be performed. Job streams are created (step 616). A job stream is a collection of jobs necessary to carry out a workflow operation. A job stream comprises the job and any dependencies for that job. Logical resource pamphlets are created (step 618). A logical resource pamphlet tells what resources are going to be used. Target objects are created (step 620). A target object is the system on which a job is to be executed. The above described steps vary with the particular implementation of the data center and any provisioning policies.

Steps 604-614 are distributed tasks. Steps, 602, and 616-620 are common tasks. Common tasks are tasks that are dependent on the environment and specific resources. Distributed tasks are generic tasks and do not depend on specific resources or environments.

Embodiments of the present invention dramatically simplifies many problems of data center management, such as managing a large number of provisioning operations against a large variety of distributed targets and correlating the results. Embodiments of the present invention provide an effective way to manage provisioning operations dealing with large numbers of targets.

It is important to note that while embodiments of the present invention has been described in the context of a fully functioning data processing system, those of ordinary skill in the art will appreciate that the processes of embodiments of the present invention are capable of being distributed in the form of a computer usable medium of instructions and a variety of forms and that embodiments of the present invention applies equally regardless of the particular type of signal bearing media actually used to carry out the distribution. Examples of computer usable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer usable media may take the form of coded formats that are decoded for actual use in a particular data processing system.

The description of embodiments of the present invention has been presented for purposes of illustration and description, and is not intended to be exhaustive or limited to embodiments of the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing an automated resource provisioning management system, wherein the automated resource provisioning management system comprises a plurality of provisioning operations, the method comprising:

creating a workload plan based on data center provisioning operations of a data center;

creating, from the workload plan, a task flow job stream that comprises a plurality of workload jobs, wherein each of the plurality of workload jobs includes a workload job definition;

linking each particular workload job in the plurality of workload jobs to a corresponding particular provisioning operation of the plurality of provisioning operations of the automated resource provisioning management system, wherein said workload job definition comprises information to facilitate an un-provisioning of a failing workload job, and a recovery job;

designating a set of workload jobs to be managed from the plurality of workload jobs;

identifying job dependencies of each job of the set of workload jobs to be managed;

scheduling each job of the set of workload jobs to be managed;

invoking each job of the set of workload jobs to be managed;

auditing each job of the set of workload jobs to be managed; and responsive to a workload job failing, automatically invoking the recovery job to un-provision the failing workload job.

2. The method of claim 1, further comprising
providing a real-time status of the set of workload jobs to be managed, wherein the step of invoking each job further comprises sending a command to the automated resource provisioning management system to invoke a particular provisioning operation corresponding to the each job.

3. The method of claim 2, wherein the steps of designating a set of workload jobs to be managed from the plurality of workload jobs and scheduling each job of the set of workload jobs to be managed can be modified manually by an administrator.

4. The method of claim 3, wherein the administrator modifies the steps of designating a set of workload jobs to be managed from the plurality of workload jobs and scheduling each job of the set of workload jobs to be managed using a job scheduler console.

5. The method of claim 2, wherein the steps of designating a set of workload jobs to be managed of the plurality of workload jobs, identifying job dependencies of each job of the set of workload jobs to be managed, scheduling each job of the set of workload jobs to be managed, invoking each job of the set of workload jobs to be managed, and auditing each job of the set of workload jobs to be managed is performed by a workload scheduler.

6. A computer program product for managing an automated resource provisioning management system, wherein the automated resource provisioning management system comprises a plurality of provisioning operations, the computer program product comprising:
   a non-transitory computer usable, recordable-type medium having computer usable program code stored therein and executable by a data processing system to manage the automated resource provisioning management system, the computer usable program code comprising;
   computer readable program code configured to create a workload plan based on data center provisioning operations of a data center;
   computer readable program code configured to create, from the workload plan, a task flow job stream that comprises a plurality of workload jobs, wherein each of the plurality of workload jobs includes a workload job definition;
   computer readable program code configured to link each particular workload job in the plurality of workload jobs to a corresponding provisioning operation of the plurality of provisioning operations of the automated resource provisioning management system, wherein said workload job definition comprises information to facilitate an un-provisioning of a failing workload job, and a recovery job;
   computer readable program code configured to designate a set of workload jobs to be managed from the plurality of workload jobs;
   computer readable program code configured to identify job dependencies of each job of the set of workload jobs to be managed;
   computer readable program code configured to schedule each job of the set of workload jobs to be managed;
   computer readable program code configured to invoke each job of the set of workload jobs to be managed;
   computer readable program code configured to audit each job of the set of workload jobs to be managed; and
   computer readable program code configured, responsive to a workload job failing, to automatically invoke the recovery job to un-provision the failing workload job.

7. The computer program product of claim 6, further comprising:
   computer readable program code configured to provide a real-time status of the set of workload jobs to be managed, wherein the computer readable program code configured to invoke each job further comprises computer readable program code to send a command to the automated resource provisioning management system to invoke a particular provisioning operation corresponding to the each job.

8. The computer program product of claim 7, wherein the steps of designating a set of workload jobs to be managed from the plurality of workload jobs and scheduling each job of the set of workload jobs to be managed can be modified manually by an administrator.

9. The computer program product of claim 8, wherein the administrator modifies the steps of wherein the steps of designating a set of workload jobs to be managed from the plurality of workload jobs and scheduling each job of the set of workload jobs to be managed using a job scheduler console.

10. The computer program product of claim 7, wherein the computer readable program code configured to designate a set of workload jobs to be managed from the plurality of workload jobs, computer readable program code configured to identify job dependencies of each job of the set of workload jobs to be managed, computer readable program code configured to schedule each job of the set of workload jobs to be managed, computer readable program code configured to invoke each job of the set of workload jobs to be managed, and computer readable program code configured to audit each job of the set of workload jobs to be managed are performed by a workload scheduler.

11. A data processing system for managing an automated resource provisioning management system, wherein the automated resource provisioning management system comprises a plurality of provisioning operations, the data processing system comprising:
   a data processor coupled to a memory and operable for executing instructions in the memory to perform steps of:
   creating a workload plan based on data center provisioning operations of a data center;
   creating, from the workload plan, a task flow job stream that comprises a plurality of workload jobs, wherein each of the plurality of workload jobs includes a workload job definition;
   linking each particular workload job in the plurality of workload jobs to a corresponding provisioning operation of the plurality of provisioning operations of the automated resource provisioning management system, wherein said workload job definition comprises information to facilitate an un-provisioning of a failing workload job, and a recovery job;
   designating a set of workload jobs to be managed from the plurality of workload jobs;
   identifying job dependencies of each job of the set of workload jobs to be managed;
   scheduling each job of the set of workload jobs to be managed;

invoking each job of the set of workload jobs to be managed;

auditing each job of the set of workload jobs to be managed; and automatically invoking the recovery job responsive to a workload job failing to un-provision the failing workload job.

12. The data processing system of claim 11, further comprising providing a real-time status of the set of workload jobs to be managed, wherein the step of invoking each job further comprises sending a command to the automated resource provisioning management system to invoke a particular provisioning operation corresponding to the each job.

13. The data processing system of claim 12, wherein designating a set of workload jobs to be managed from the plurality of workload jobs and scheduling each job of the set of workload jobs to be managed can be modified manually by an administrator.

14. The data processing system of claim 13, wherein the administrator modifies the steps of designating a set of workload jobs to be managed from the plurality of workload jobs and scheduling each job of the set of workload jobs to be managed using a job scheduler console.

15. The data processing system of claim 12, wherein the designating mechanism, identifying mechanism, scheduling mechanism, invoking mechanism, and auditing mechanism are part of a workload scheduler.

* * * * *